United States Patent
Baldovino et al.

(10) Patent No.: US 11,767,929 B2
(45) Date of Patent: Sep. 26, 2023

(54) ASSEMBLY FOR SENSOR CLEANING WITH SOLENOID

(71) Applicants: Ford Global Technologies, LLC, Dearborn, MI (US); Valeo North America, Inc., Auburn Hills, MI (US)

(72) Inventors: Segundo Baldovino, Novi, MI (US); Ashwin Arunmozhi, Canton, MI (US); Venkatesh Krishnan, Canton, MI (US); Charles Prain, Auburn Hills, MI (US); Michael Whitney, Auburn Hills, MI (US); William S. Smith, Auburn Hills, MI (US); Theophile Jullien, Auburn Hills, MI (US); Denis Thebault, Auburn Hills, MI (US); Jean Baptiste Lahilaire, Auburn Hills, MI (US)

(73) Assignees: Ford Global Technologies, LLC, Dearborn, MI (US); Valeo North America, Inc., Auburn Hills, MI (US)

( * ) Notice: Subject to any disclaimer, the term of this patent is extended or adjusted under 35 U.S.C. 154(b) by 179 days.

(21) Appl. No.: 17/214,352

(22) Filed: Mar. 26, 2021

(65) Prior Publication Data
US 2022/0307622 A1  Sep. 29, 2022

(51) Int. Cl.
| | |
|---|---|
| *F16K 37/00* | (2006.01) |
| *G01L 1/22* | (2006.01) |
| *B60S 1/56* | (2006.01) |
| *G01L 5/1627* | (2020.01) |
| *F16K 31/06* | (2006.01) |

(Continued)

(52) U.S. Cl.
CPC ............ *F16K 37/0041* (2013.01); *B60S 1/56* (2013.01); *F16K 31/0675* (2013.01); *F16K 37/00* (2013.01); *G01L 1/22* (2013.01); *G01L 5/0057* (2013.01); *G01L 5/1627* (2020.01); *G01S 7/497* (2013.01); *G01S 2007/4977* (2013.01)

(58) Field of Classification Search
CPC .. F16K 31/0675; F16K 37/00; F16K 37/0041; G01L 5/0057; G01L 1/22; G01L 5/1627; G01S 7/497
See application file for complete search history.

(56) References Cited

U.S. PATENT DOCUMENTS

| | | | | |
|---|---|---|---|---|
| 9,352,629 | B2 * | 5/2016 | Chabanon | F16F 1/3665 |
| 10,641,668 | B2 * | 5/2020 | Danzy | F16K 17/04 |

(Continued)

FOREIGN PATENT DOCUMENTS

| | | |
|---|---|---|
| WO | 2019028061 A1 | 2/2019 |
| WO | 2020153081 A1 | 7/2020 |

*Primary Examiner* — Michael R Reid
(74) *Attorney, Agent, or Firm* — Frank A. MacKenzie; Bejin Bieneman PLC (57) ABSTRACT

An assembly includes an inlet tube. The assembly includes a first outlet tube. The assembly includes a solenoid assembly having a plunger movable between an open position in which fluid is permitted to flow from the inlet tube to the outlet tube and a closed position in which fluid is inhibited from flowing from the inlet tube to the outlet tube. The solenoid assembly has a spring urging the plunger to the closed position. The solenoid assembly has a strain gage fixed to the spring. A strain detected by the strain gage indicates whether the plunger is at the closed position.

15 Claims, 6 Drawing Sheets

(51) Int. Cl.
*G01L 5/00* (2006.01)
*G01S 7/497* (2006.01)

(56) References Cited

U.S. PATENT DOCUMENTS

| | | | |
|---|---|---|---|
| 2004/0031911 A1* | 2/2004 | Hoffmann | F01L 9/20 |
| | | | 250/227.19 |
| 2005/0092079 A1 | 5/2005 | Ales et al. | |
| 2011/0260085 A1 | 10/2011 | van der Zee et al. | |
| 2017/0120263 A1 | 5/2017 | Needham | |
| 2022/0080930 A1* | 3/2022 | Kawamura | B60S 1/56 |

* cited by examiner

ASSEMBLY FOR SENSOR CLEANING WITH SOLENOID

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices. Sensor operation can be affected by obstructions, e.g., dust, snow, insects, etc.

DETAILED DESCRIPTION

An assembly includes an inlet tube. The assembly includes a first outlet tube. The assembly includes a solenoid assembly having a plunger movable between an open position in which fluid is permitted to flow from the inlet tube to the outlet tube and a closed position in which fluid is inhibited from flowing from the inlet tube to the outlet tube. The solenoid assembly has a spring urging the plunger to the closed position. The solenoid assembly has a strain gage fixed to the spring. A strain detected by the strain gage indicates whether the plunger is at the closed position.

The assembly may include a computer having a processor and memory, the computer in communication with the strain gage, the memory storing instructions executable by the processor to determine whether the plunger is at the closed position based on data received from the strain gage.

The instructions may include instructions to store a diagnostic code upon determining the plunger is not at the closed position.

The solenoid assembly may include a plurality of strain gages including the strain gage, the plurality of strain gages fixed to the spring, and strains detected by the plurality of strain gages may indicate whether the plunger is at the closed position.

The spring may include a plurality of coils, the plurality of strain gages fixed to adjacent coils of the plurality of coils.

The plurality of strain gages may include four strain gages electrically connected in a Wheatstone bridge arrangement.

The assembly may include a computer having a processor and memory, the computer in communication with the plurality of strain gages, the computer programmed to determine whether the plunger is at the closed position based on data received from the plurality of strain gages.

The spring may include a plurality of coils and is elongated between distal ends, and one or more coils of the plurality of coils may be between the strain gage and one of the distal ends and one or more coils of the plurality of coils may be between the strain gage and the other of the distal ends.

The assembly may include a fluid reservoir fluidly connected with the inlet tube.

The assembly may include a nozzle fluidly connected with the first outlet tube.

The assembly may include a camera, the nozzle facing the camera.

The assembly may include a second outlet tube and a second solenoid assembly having a second plunger movable between a second open position in which fluid is permitted to flow from the inlet tube to the second outlet tube and a second closed position in which fluid is inhibited from flowing from the inlet tube to the second outlet tube, the second solenoid assembly having a second spring urging the second plunger to the second closed position, the second solenoid assembly having a second strain gage fixed to the second spring, and wherein a strain detected by the second strain gage indicates whether the second plunger is at the closed position.

The solenoid assembly may include an induction coil surrounding the plunger.

A solenoid assembly includes a plunger movable between a first position and a second position. The solenoid assembly includes a spring urging the plunger to the second position. The solenoid assembly includes a strain gage fixed to the spring. A strain detected by the strain gage indicates whether the plunger is at the second position.

The solenoid assembly may include a plurality of strain gages including the strain gage, the plurality of strain gages fixed to the spring, and wherein strains detected by the plurality of strain gages indicate whether the plunger is at the second position.

The spring may include a plurality of coils, the plurality of strain gages fixed to adjacent coils of the plurality of coils.

The plurality of strain gages may include four strain gages electrically connected in a Wheatstone bridge arrangement.

The spring may include a plurality of coils and may be elongated between distal ends, and one or more coils of the plurality of coils may be between the strain gage and one of the distal ends and one or more coils of the plurality of coils may be between the strain gage and the other of the distal ends.

The solenoid assembly may include an induction coil surrounding the plunger.

With reference to the Figures, wherein like numerals indicate like parts throughout the several views, a vehicle 20 having an assembly 22 that controls cleaning fluid for, e.g., autonomous operation of the vehicle 20 is shown. The assembly 22 includes an inlet tube 24 and an outlet tube 26. The assembly 22 includes a solenoid assembly 28 having a plunger 30 movable between an open position in which fluid is permitted to flow from the inlet tube 24 to the outlet tube 26 and a closed position in which fluid is inhibited from flowing from the inlet tube 24 to the outlet tube 26. The solenoid assembly 28 has a spring 32 urging the plunger 30 to the closed position. The solenoid assembly 28 has a strain gage 34 fixed to the spring 32. A strain detected by the strain gage 34 indicates whether the plunger 30 is at the closed position.

Figure 1:
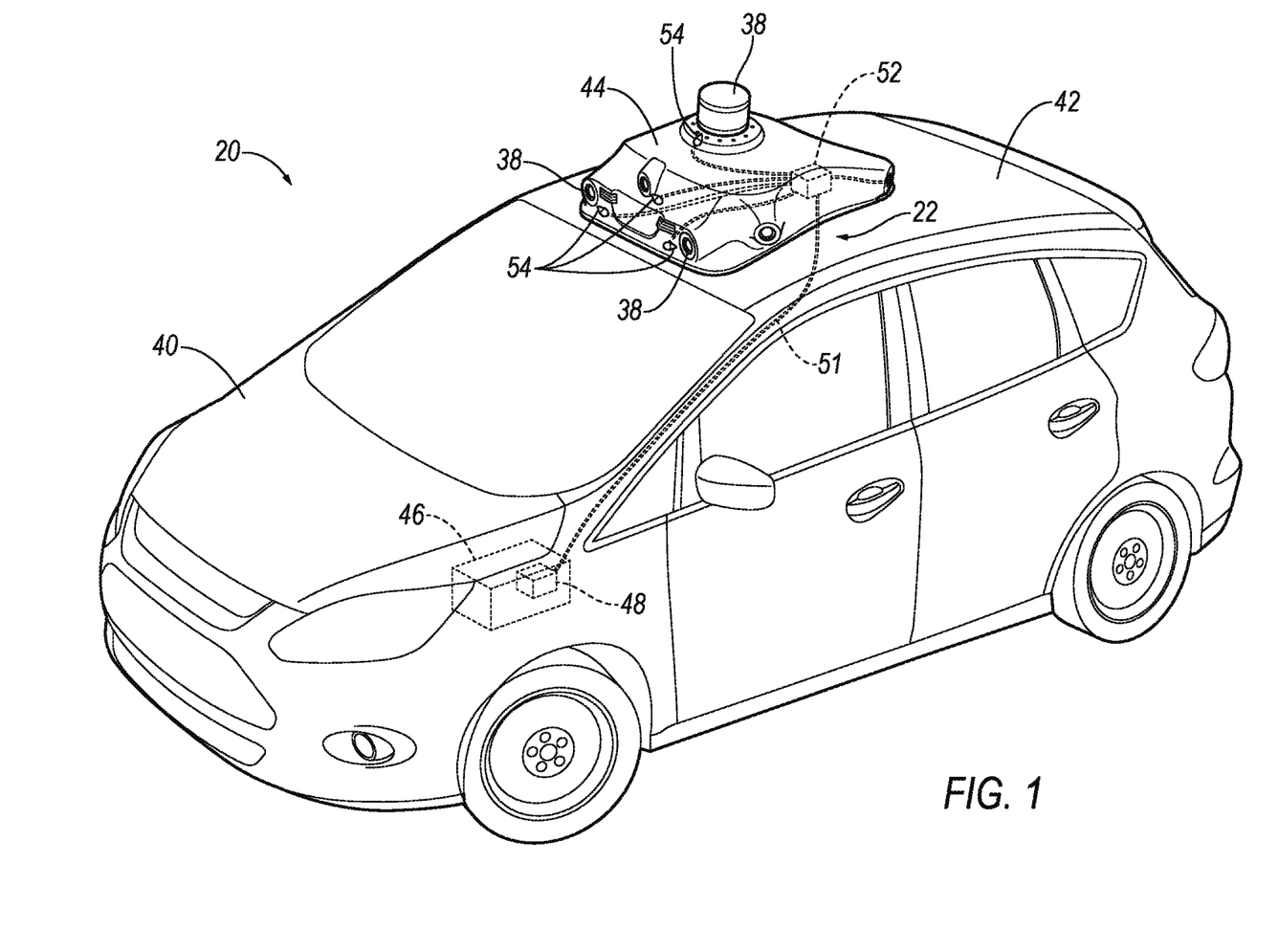
FIG. 1 is a perspective view of a vehicle having an assembly that controls cleaning fluid for sensors of the vehicle.

With reference to FIG. 1, the vehicle 20 can be any passenger or commercial automobile such as a car, a truck, a sport utility vehicle, a crossover, a van, a minivan, a taxi, a bus, etc.

The vehicle 20 may be an autonomous vehicle. A computer 36 (illustrated in FIG. 6) can be programmed to operate the vehicle 20 independently of the intervention of a human driver, completely or to a lesser degree. The computer 36 may be programmed to operate a propulsion, brake system, steering, and/or other vehicle 20 systems based at least in part on data received from sensors 38. For the purposes of this disclosure, autonomous operation means the computer 36 controls the propulsion, brake system, and steering without input from a human driver; semi-autonomous operation means the computer 36 controls one or two of the propulsion, brake system, and steering and a human driver controls the remainder; and nonautonomous operation means a human driver controls the propulsion, brake system, and steering.

The vehicle 20 includes a body 40. The vehicle 20 may be of a unibody construction, in which a frame and the body 40 of the vehicle 20 are a single component. The vehicle 20 may, alternatively, be of a body-on-frame construction, in which the frame supports the body 40 that is a separate component from the frame. The frame and body 40 may be formed of any suitable material, for example, steel, aluminum, etc.

The body 40 includes body panels partially defining an exterior of the vehicle 20. The body panels may present a class-A surface, e.g., a finished surface exposed to view by a customer and free of unaesthetic blemishes and defects. The body panels include, e.g., a roof 42, etc.

A housing 44 for the sensors 38 is attachable to the vehicle 20, e.g., to one of the body 40 panels of the vehicle 20, e.g., the roof 42. For example, the housing 44 may be shaped to be attachable to the roof 42, e.g., may have a shape matching a contour of the roof 42. The housing 44 may be attached to the roof 42, which can provide the sensors 38 with an unobstructed field of view of an area around the vehicle 20. The housing 44 may be formed of, e.g., plastic or metal.

The sensors 38 may detect the location and/or orientation of the vehicle 20. For example, the sensors 38 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 38 may detect the external world, e.g., objects and/or characteristics of surroundings of the vehicle 20, such as other vehicles, road lane markings, traffic lights and/or signs, pedestrians, etc. For example, the sensors 38 may include radar sensors, scanning laser range finders, light detection and ranging (LIDAR) devices, and image processing sensors such as cameras. The sensors 38 may include communications devices, for example, vehicle-to-infrastructure (V2I) or vehicle-to-vehicle (V2V) devices.

The sensors 38 are disposed within, and/or are mounted to, the housing 44. For example, the sensors 38 can include multiple cameras disposed within the housing 44 and at least one LIDAR device mounted to the housing 44.

Figure 2:
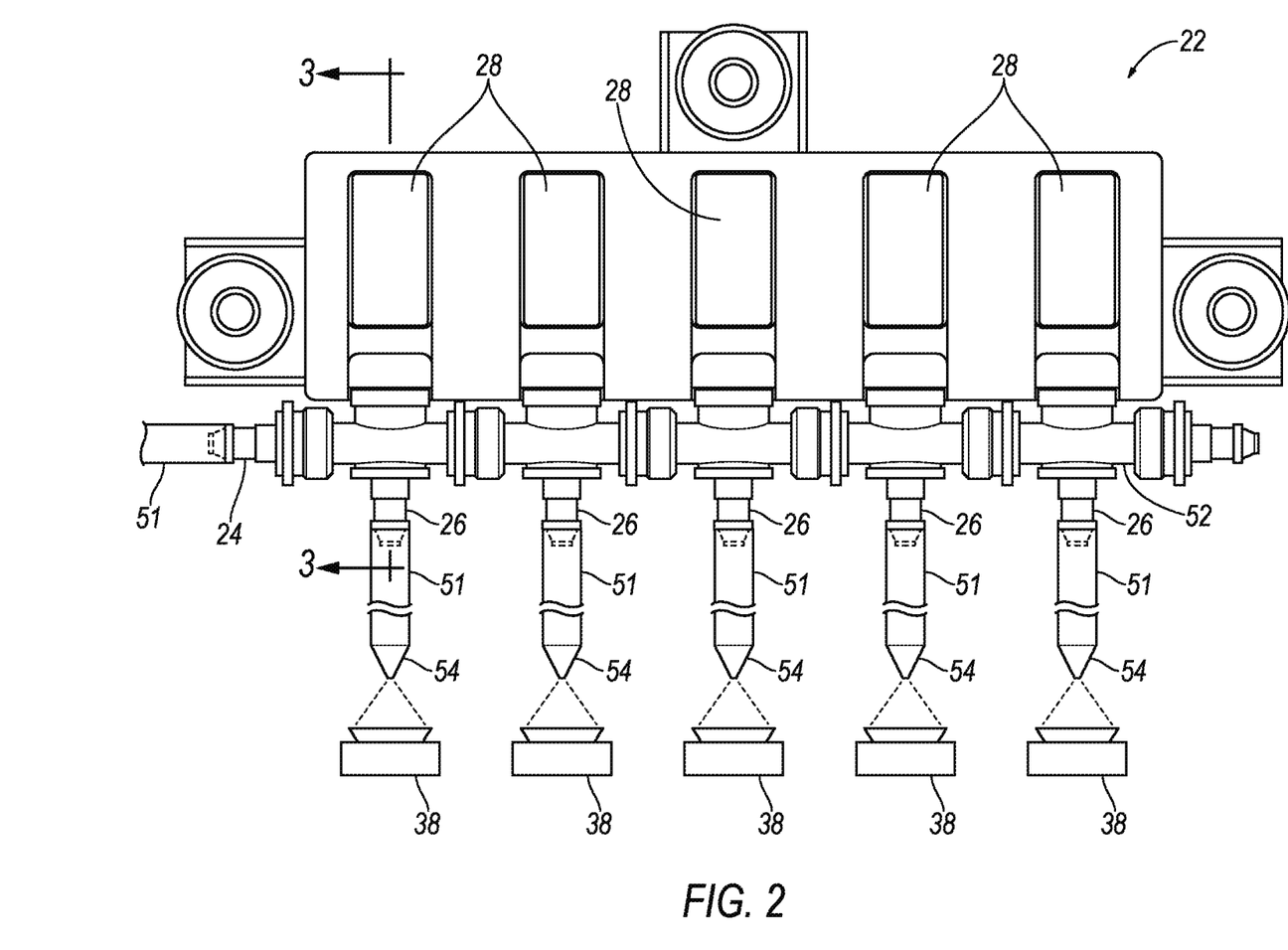
FIG. 2 is a side view of components of the assembly.

With reference to FIGS. 1 and 2, the assembly 22 may include a reservoir 46, a pump 48, supply lines 51, a manifold 52 (which includes the inlet tube 24 and one or more outlet tubes 26), and nozzles 54. The reservoir 46, the pump 48, the manifold 52, and the nozzles 54 are fluidly connected to each other (i.e., fluid can flow from one to the other) via the supply lines 51. The assembly 22 distributes washer fluid stored in the reservoir 46 to the nozzles 54. "Washer fluid" is any liquid stored in the reservoir 46 for cleaning. The washer fluid may include solvents, detergents, diluents such as water, etc.

The reservoir 46 is a tank fillable with liquid, e.g., washer fluid for window cleaning. The reservoir 46 may be disposed in a front of the vehicle 20, specifically, in an engine compartment forward of a passenger cabin. Alternatively, the reservoir 46 may be disposed within the housing 44. Alternatively or additionally, the assembly 22 could use compressed air routed through the manifold 52 and the supply lines 51 to the nozzles 54.

The pump 48 can force the washer fluid through the supply lines 51 and the manifold 52 to the nozzles 54 with sufficient pressure that the washer fluid sprays from the nozzles 54. The pump 48 is fluidly connected to the reservoir 46. The pump 48 may be attached to or disposed in the reservoir 46. The pump 48 is fluidly connected to the manifold 52, specifically to the inlet tube 24 of the manifold 52, via one of the supply lines 51.

The manifold 52 includes the inlet tube 24 and one or more outlet tubes 26, which can vary in number. In the example shown in Figures, the manifold 52 includes five outlet tubes 26.

The manifold 52 can direct washer fluid entering the inlet tube 24 to any combination of the outlet tubes 26. The manifold 52 can be disposed within, and fixed relative to, the housing 44.

The manifold 52 receives fluid from the reservoir 46 at the inlet tube 24. For example, one of the supply lines 51 may extend from the pump 48 to the inlet tube 24 of the manifold 52. The manifold 52 provides the fluid to one or more nozzles 54 via the outlet tubes 26. For example, the supply lines 51 may extend from the outlet tubes 26 of the manifold 52 to the nozzles 54. The supply lines 51 may be, e.g., flexible tubes.

Each of the nozzles 54 is fluidly connected to one of the outlet tubes 26 via one of the supply lines 51. The nozzles 54 may face the camera or other sensors 38 of the assembly 22. In other words, the nozzles 54 are positioned to eject the washing fluid to clear obstructions from fields of view of the sensors 38, e.g., nozzles 54 may be aimed at the sensors 38 or at windows (not labeled) for the sensors 38. The pressure of the washer fluid exiting the nozzles 54 can dislodge or wash away obstructions that may impede the fields of view of the sensors 38.

Figures 3, 3A:
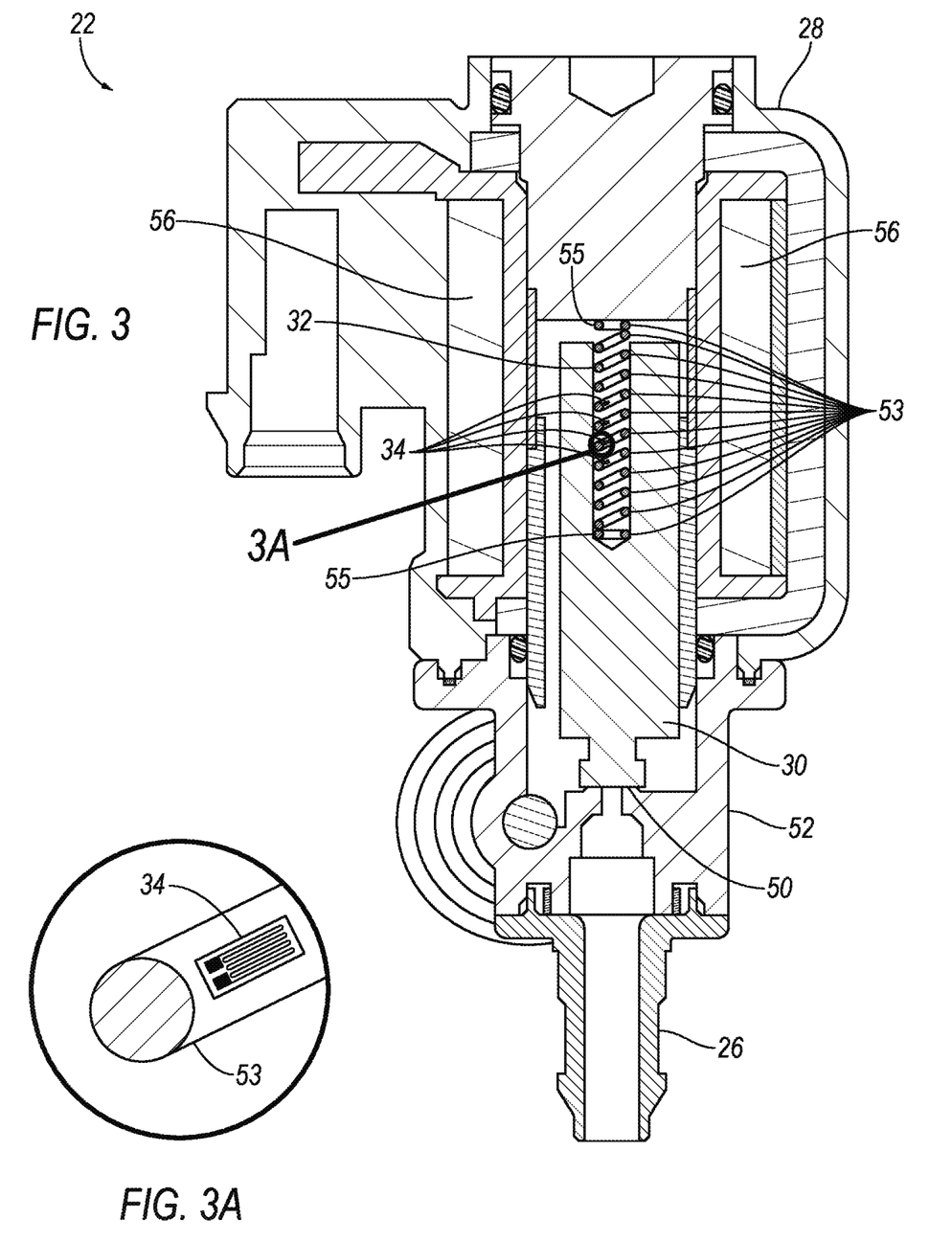
FIG. 3 is a cross section of components of the assembly in a closed position and taken along a line 3-3 of FIG. 2.
FIG. 3A is an enlarged view of a portion of FIG. 3.
Figure 4:
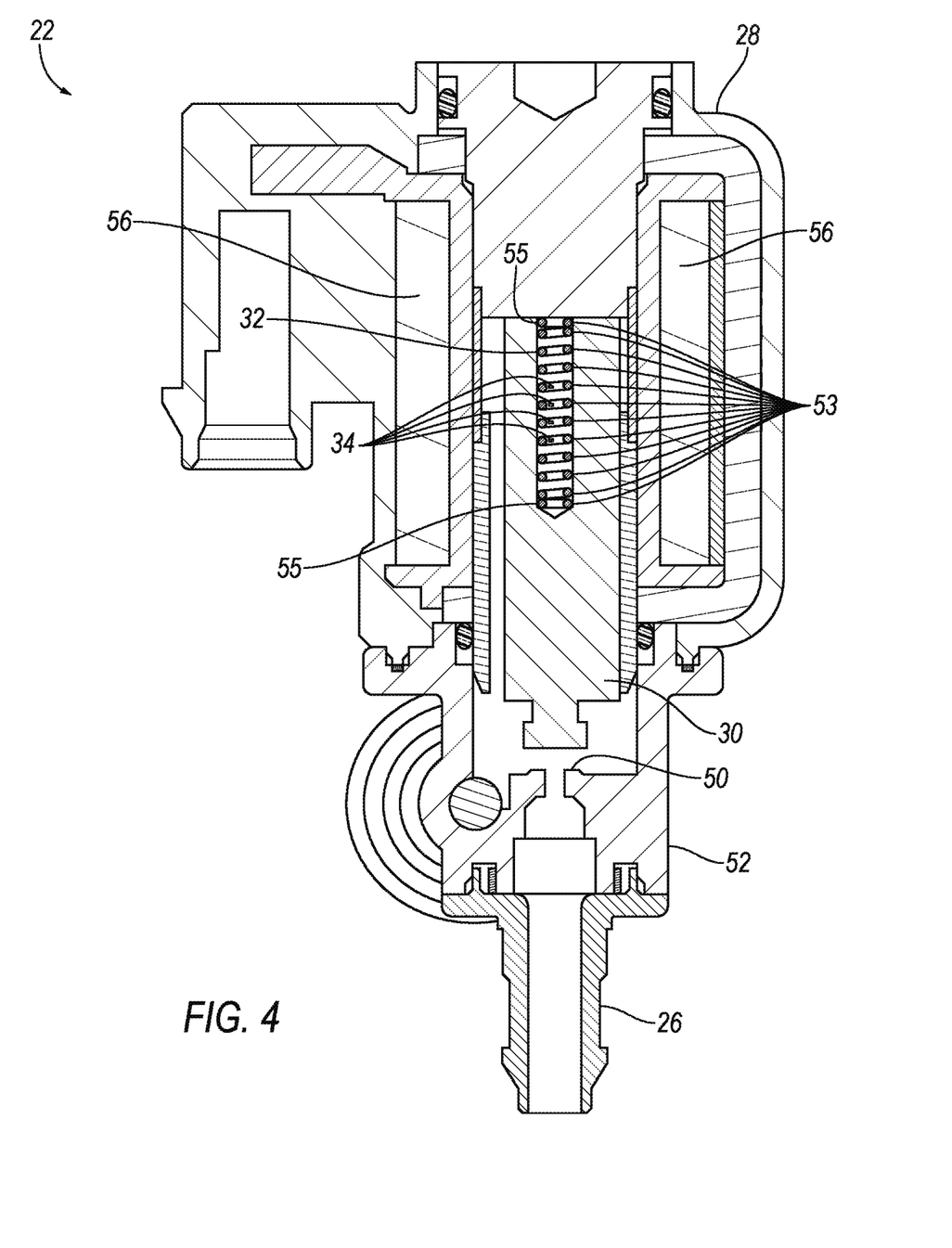
FIG. 4 is a cross section of components of the assembly in an open position and taken along the line 3-3.

With refence to FIGS. 2-4, the solenoid assembly 28 controls fluid flow from the inlet tube 24 to one of the outlet tubes 26 and the nozzle 54 connected thereto. The solenoid assembly 28 includes the plunger 30. The plunger 30 is movable between the closed position, shown in FIG. 3, in which fluid is inhibited from flowing from the inlet tube 24 to such outlet tube 26, and the open position, shown in FIG. 4, in which fluid is permitted to flow from the inlet tube 24 to one of the outlet tubes 26. For example, the manifold 52 may include valve seats 50, shown in FIGS. 3 and 4, surrounding each of the outlet tubes 26. The plunger 30 in the closed position may abut the valve seat 50 surrounding one of the outlet tubes 26. The plunger 30 in the open position may be spaced from the valve seat 50 surrounding one of the outlet tubes 26. Fluid may flow through the space between the plunger 30 and the valve seat 50 into such outlet tube 26. The plunger 30 and/or the valve seats 50 may include a rubber coating or other sufficient structure that seals the plunger 30 to the valve seat 50 in the closed position, i.e., such that fluid is inhibited from flowing therebetween.

With reference to FIGS. 3 and 4, the spring 32 of the solenoid assembly 28 includes a plurality of coils 53. The spring 32 is elongated between distal ends 55. For example, the spring 32 may be a conventional compression coil spring. One of the distal ends 55 of the spring 32 may abut the plunger 30. The spring 32 may be under compression in both the open position and the closed position, urging the plunger 30 toward the closed position. For example, internal forces from the spring 32 may urge the plunger 30 toward the valve seat 50.

The solenoid assembly 28 includes an induction coil 56 surrounding the plunger 30. The induction coil 56 is actuatable to move the plunger 30 to the open position. The induction coil 56 includes a plurality of windings surrounding around the plunger 30. The induction coil 56 generates a magnetic field, e.g., in response to electric current flow through the windings. The magnetic field may urge the plunger 30 toward the open position. For example, when no electric current is supplied to the windings, force from the spring 32 may maintain the plunger 30 at the closed position. Upon application of electric current to the windings, force from the magnetic field generated by the induction coil 56 may overcome the force of the spring 32 and move the plunger 30 to the open position.

The solenoid assembly 28 includes one or more strain gages 34 fixed to the spring 32, e.g., via adhesive or the like. For example, four strain gages 34 may be fixed to the coils 53 of the spring 32. The strain gage 34 detects strain in the spring 32 by providing a varied resistance that corresponds to a tension or compression allied to the strain gage 34. The strain gage 34 may include, for example, a conventional strain gage having a metallic foil arranged in a zig-zag pattern, as shown in FIG. 3A.

Figure 5:
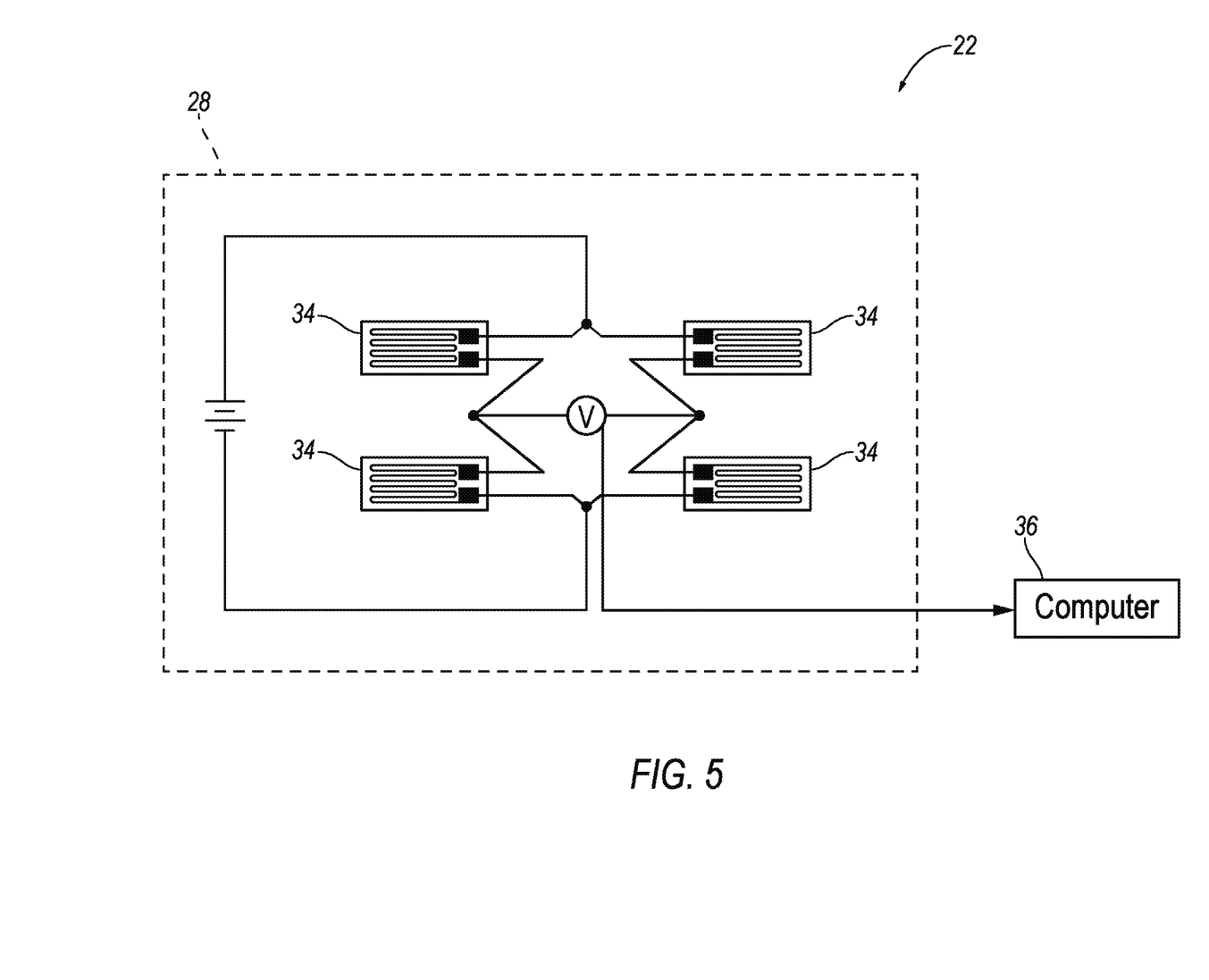
FIG. 5 is an electrical schematic of components of the assembly.

The strain gages 34 may be fixed to adjacent coils 53 of the spring 32, i.e., fixed to coils 53 that are next to each other and without any other coils 53 therebetween. One or more coils 53 not having one of the strain gages 34 fixed thereto may be between the strain gages 34 and the distal ends 55. In other words, the strain gages 34 may be spaced from the distal ends 55 by at least one coil 53 that does not have one of the strain gages 34. Fixing the strain gages 34 to adjacent coils 53 spaced from the distal ends 55 may provide increased accuracy in detecting strain of the spring 32, e.g., compared to having strain gages 34 at the distal ends 55 and/or having coils 53 between the stain gages 34. Four of the strain gages 34 fixed to the spring 32 may be electrically connected in a Wheatstone bridge arrangement, illustrated in FIG. 5. The Wheatstone bridge arrangement may provide increased accuracy in detecting strain of the spring 32, e.g., compared to a single strain gage or other arrangements of multiple strain gages.

Compression of the spring 32 increases the strain detected by the strain gage 34. Expansion of the spring 32 decreases strain detected by the strain gage 34. In other words, the strain detected by the strain gage 34 varies, e.g., linearly, along with a change in length of the spring 32. The strain detected by the strain gages 34 indicates whether the plunger 30 is at the closed position. For example, the strain gages 34 may detect a predetermined amount of strain when spring 32 is sufficiently extended such that the plunger 30 abuts the valve seat 50. The predetermined amount of strain may be stored in memory of the computer 36.

As shown in FIG. 2, the assembly 22 may include multiple solenoid assemblies 28 that control fluid flow through the outlet tubes 26 of the manifold 52. The solenoid assemblies 28 may be fixed to the manifold 52, e.g., one of the solenoid assemblies 28 may be at each of the outlet tubes 26. Each of the solenoid assemblies 28 may include the plunger 30, the spring 32, the stain gages 34, and the induction coil 56, e.g., as described herein. One of the solenoid assemblies 28 may control fluid flow through one of the outlet tubes 26 to one of the nozzles 54, and another of the solenoid assemblies 28 may control fluid flow through another of the outlet tubes 26 to another of the nozzles 54. For example, the solenoid assemblies 28 can independently block or open each of the respective outlet tubes 26 by moving plungers 30 of the solenoid assemblies 28.

Figure 6:
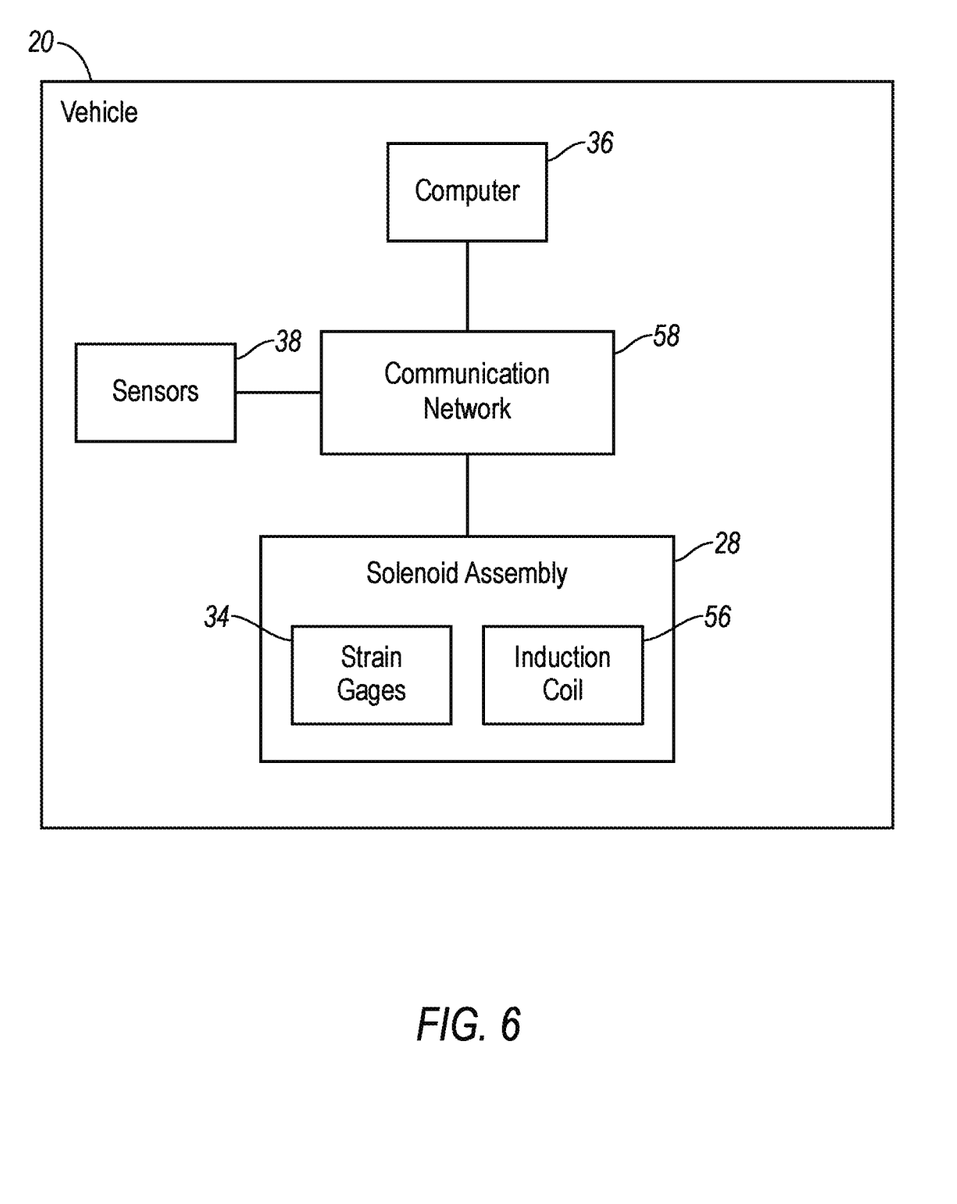
FIG. 6 is a block diagram of components of the vehicle and the assembly.

With refence to FIG. 6, the computer 36 is a microprocessor-based controller implemented via circuits, chips, or other electronic components. The computer 36 includes a processor and a memory such as are known. The memory includes one or more forms of computer readable media, and stores instructions executable by the computer 36 for performing various operations, including as disclosed herein. The computer 36 may be programmed to execute operations disclosed herein. Specifically, the memory stores instructions executable by the processor to execute the operations disclosed herein and electronically stores data and/or databases. For example, the computer 36 may include one or more dedicated electronic circuit including an ASIC (Application Specific Integrated Circuit) that is manufactured for a particular operation. In another example, the computer 36 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g., stored in a memory electrically connected to the FPGA circuit. In some examples, a combination of processor(s), ASIC(s), and/or FPGA circuits may be included inside a chip packaging. The computer 36 may be a set of computers communicating with one another.

The computer 36 is generally arranged for communications on a communication network 58 that can include a bus in the vehicle 20 such as a controller area network (CAN) or the like, and/or other wired and/or wireless mechanisms. Via the communication network 58, the computer 36 may transmit messages to various devices, and/or receive messages (e.g., CAN messages) from the various devices, e.g., the sensors 38, the solenoid assemblies 28 (including the induction coil 56 and the strain gages 34 of each solenoid assembly 28), etc. Alternatively or additionally, in cases where the computer 36 comprises a plurality of devices, the communication network 58 may be used for communications between devices represented as the computer 36 in this disclosure.

The computer 36 is programmed to, i.e., the memory stores instructions executable by the processor to, actuate the plungers 30 of the respective solenoid assemblies 28, e.g., from the open position to the closed position and vice versa. The computer 36 may actuate the plunger 30 of one of the solenoid assemblies 28 to the open position by transmitting a command to such solenoid assembly 28, e.g., via the communication network 58. The command may, for example, provide electrical current to the induction coil 56 of the solenoid assembly 28 and generate a magnetic field that urges the plunger 30 away from the valve seat 50 with sufficient force to overcome the force applied to the plunger 30 by the spring 32. The computer 36 may actuate the plunger 30 to the closed position by transmitting a command to the solenoid assembly 28, e.g., via the communication network 58. The command may, for example, cease providing electrical current to the induction coil 56 of the solenoid assembly 28, thereby permitting force from the spring 32 to move the plunger 30 to the closed position in abutment with the valve seat 50. The computer 36 may individually and selectively actuate the solenoid assemblies 28, i.e., actuate one or more of the solenoid assemblies 28 and not others. The computer 36 may individually and selectively actuate the solenoid assemblies 28 to clean selected sensors 38 of the vehicle 20.

The computer 36 is programmed to determine whether the plungers 30 of each of the solenoid assemblies 28 is at the closed position based on data received from the strain gage(s) 34 of such solenoid assembly 28, e.g., via the communication network 58. The computer 36 may determine whether the plunger 30 is at the closed position by comparing the strain detected by the strain gage(s) 34 with a first predetermined amount of strain. The computer 36 may determine the plunger 30 is at the closed position when the detected strain is equal to (or less than) the first predetermined amount of strain. The first predetermined amount may be predetermined by empirical testing, e.g., as being equal to a strain detected by the strain gage(s) 34 when the plunger 30 is known to be in the closed position, e.g., when fluid pressure is supplied to the inlet tube 24 and does not flow from the outlet tube 26 closed by the plunger 30. The first predetermined amount may be stored in memory. The computer 36 may determine the plunger 30 is not at the closed position when the detected strain is greater than the first predetermined amount. For example, a strain detected by the strain gage(s) 34 may be greater when dirt or other debris inhibits the spring 32 from fully extending and moving the plunger 30 to the closed position than a strain detected by the strain gage(s) 34 when the spring 32 is fully extended with the plunger 30 in the closed position. The computer 36 may individually determine whether the plunger 30 of each of the solenoid assemblies 28 is at the closed position based on data received from the strain gage(s) 34 of the respective solenoid assembly 28. The computer 36 may determine whether the plunger 30 of one of the solenoid assemblies 28 is at the closed position after the computer 36 actuates such plunger 30 to the closed position, e.g., after the computer 36 has ceased current flow to the induction coil 56 of such solenoid assembly 28.

The computer 36 is programmed to store a diagnostic code, e.g., in memory, upon determining the plunger 30 of one of the solenoid assemblies 28 is not at the closed position. The diagnostic code may include data specifying which specific solenoid assembly 28 included the plunger 30 that was determined not to be at the closed position. Additionally and upon determining the plunger 30 of one of the solenoid assemblies 28 is not at the closed position, the computer 36 may transmit an error code to a server computer and/or transition the vehicle 20 from autonomous operation to nonautonomous operation.

The computer 36 is programmed to determine whether the plunger 30 of each of the solenoid assemblies 28 is at the open position based on data received from the strain gage(s) 34 of such solenoid assembly 28, e.g., via the communication network 58. The computer 36 may determine whether the plunger 30 is at the open position by comparing the strain detected by the strain gage(s) 34 with a second predetermined amount of strain. The computer 36 may determine the plunger 30 is at the open position when the detected strain is equal to (or greater than) the second predetermined amount. The computer 36 may determine the plunger 30 is not at the open position when the detected strain is less than the second predetermined amount. The second predetermined amount may be stored in memory and predetermined by empirical testing, e.g., as being equal to a strain detected by the strain gage(s) 34 when the plunger 30 is known to be in the open position, e.g., when fluid pressure is supplied to the inlet tube 24 and fluid freely flows from the respective outlet tube 26. The computer 36 may individually determine whether the plunger 30 of each of the solenoid assemblies 28 is at the open position based on data received from the strain gage(s) 34 of the respective solenoid assembly 28. The computer 36 may determine whether the plunger 30 of one of the solenoid assemblies 28 is at the open position after the computer 36 actuates the plunger 30 to the open position, e.g., after the computer 36 has commanded current flow to the induction coil 56 of such solenoid assembly 28. The computer 36 may be programmed to, upon determining the plunger 30 of one of the solenoid assemblies 28 is not at the open position, store a diagnostic code, etc.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Use of "in response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   an inlet tube;
   a first outlet tube; and
   a solenoid assembly having a plunger movable between an open position in which fluid is permitted to flow from the inlet tube to the outlet tube and a closed position in which fluid is inhibited from flowing from the inlet tube to the outlet tube;
   the solenoid assembly having a spring urging the plunger to the closed position, the spring having a plurality of coils; and
   the solenoid assembly having four strain gages fixed to four adjacent coils of the plurality of coils of the spring, the four strain gages electrically connected in a Wheatstone bridge arrangement; and
   wherein a strain detected by the four strain gages indicates whether the plunger is at the closed position.

2. The assembly of claim 1, further comprising a computer having a processor and memory, the computer in communication with the four strain gages, the memory storing instructions executable by the processor to determine whether the plunger is at the closed position based on data received from the four strain gages.

3. The assembly of claim 2, wherein the instructions include instructions to store a diagnostic code upon determining the plunger is not at the closed position.

4. The assembly of claim 1, further comprising a computer having a processor and memory, the computer in communication with the four strain gages, the computer programmed to determine whether the plunger is at the closed position based on data received from the plurality of strain gages.

5. The assembly of claim 1, wherein the spring is elongated between distal ends, and wherein one or more coils of the plurality of coils are adjacent to the four strain gages and between the four strain gages and one of the distal ends, and one or more coils of the plurality of coils are adjacent to the four strain gages and between the four strain gages and the other of the distal ends.

6. The assembly of claim 1, further comprising a fluid reservoir fluidly connected with the inlet tube.

7. The assembly of claim 6, further comprising a nozzle fluidly connected with the first outlet tube.

8. The assembly of claim 7, further comprising a camera, the nozzle facing the camera.

9. The assembly of claim 1, further comprising a second outlet tube and a second solenoid assembly having a second plunger movable between a second open position in which fluid is permitted to flow from the inlet tube to the second outlet tube and a second closed position in which fluid is inhibited from flowing from the inlet tube to the second outlet tube, the second solenoid assembly having a second spring urging the second plunger to the second closed position, the second solenoid assembly having a strain gage fixed to the second spring, and wherein a strain detected by the strain gage indicates whether the second plunger is at the closed position.

10. The assembly of claim 1, wherein the solenoid assembly includes an induction coil surrounding the plunger.

11. The assembly of claim 1, wherein the spring is elongated between distal ends, and wherein two or more coils of the plurality of coils are adjacent to the four strain gages and between the four strain gages and one of the distal ends, and two or more coils of the plurality of coils are adjacent to the four strain gages and between the four strain gages and the other of the distal ends.

12. A solenoid assembly, comprising:
    a plunger movable between a first position and a second position;
    a spring urging the plunger to the second position, the spring having a plurality of coils; and
    four strain gages fixed to four adjacent coils of the plurality of coils of the spring, the four strain gages electrically connected in a Wheatstone bridge arrangement; and
    wherein a strain detected by the four strain gages indicates whether the plunger is at the second position.

13. The solenoid assembly of claim 12, wherein the spring is elongated between distal ends, and wherein one or more coils of the plurality of coils are adjacent to the four strain gages and between the four strain gages and one of the distal ends, and one or more coils of the plurality of coils are adjacent to the four strain gages and between the four strain gages and the other of the distal ends.

14. The solenoid assembly of claim 12, wherein the solenoid assembly includes an induction coil surrounding the plunger.

15. The solenoid assembly of claim 12, wherein the spring is elongated between distal ends, and wherein two or more coils of the plurality of coils are adjacent to the four strain gages and between the four strain gages and one of the distal ends, and two or more coils of the plurality of coils are adjacent to the four strain gages and between the four strain gages and the other of the distal ends.

* * * * *